United States Patent
Boss et al.

(10) Patent No.: US 10,747,862 B2
(45) Date of Patent: Aug. 18, 2020

(54) COGNITIVE SECURITY ADJUSTMENTS BASED ON THE USER

(71) Applicant: International Business Machines Corporation, Armonk, NY (US)

(72) Inventors: Gregory J. Boss, Saginaw, MI (US); Barton W. Emanuel, Manassas, VA (US); Romelia Flores, Keller, TX (US); Cesar Augusto Rodriguez Bravo, Alajuela (CR)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 15/836,253

(22) Filed: Dec. 8, 2017

(65) Prior Publication Data
US 2019/0180013 A1 Jun. 13, 2019

(51) Int. Cl.
G06F 21/00 (2013.01)
G06F 21/32 (2013.01)

(52) U.S. Cl.
CPC ...... *G06F 21/32* (2013.01); *G06F 2221/2139* (2013.01)

(58) Field of Classification Search
None
See application file for complete search history.

(56) References Cited

U.S. PATENT DOCUMENTS

| 7,257,374 B1 | 8/2007 | Creigh | |
| 7,617,542 B2 | 11/2009 | Vataja | |
| 8,396,452 B1 | 3/2013 | Matsuoka | |
| 10,022,614 B1* | 7/2018 | Tran | B33Y 10/00 |
| 10,096,216 B1* | 10/2018 | McClintock | G08B 13/1436 |
| 2003/0120940 A1 | 6/2003 | Vataja | |
| 2011/0321157 A1* | 12/2011 | Davis | G06F 21/316 726/19 |
| 2012/0069131 A1* | 3/2012 | Abelow | G06Q 10/067 348/14.01 |
| 2014/0112556 A1* | 4/2014 | Kalinli-Akbacak | G10L 25/63 382/128 |
| 2014/0123273 A1 | 5/2014 | Matus | |
| 2014/0236953 A1* | 8/2014 | Rapaport | G06Q 10/10 707/740 |
| 2014/0330655 A1 | 11/2014 | Aziz et al. | |
| 2015/0135270 A1 | 5/2015 | Robison et al. | |
| 2016/0094547 A1* | 3/2016 | Stuntebeck | G06K 9/00281 726/7 |
| 2017/0200449 A1* | 7/2017 | Penilla | G10L 15/02 |

OTHER PUBLICATIONS

"Automatic logout", retrieved from https://people.gnome.org/~pmkovar/system-admin-guide/automatic-logout.html; as early as 2013.

(Continued)

*Primary Examiner* — Maung T Lwin
(74) *Attorney, Agent, or Firm* — Brown & Michaels, PC; Christopher Pignato (57) ABSTRACT

Different security changes are applied based on the user status, such as emotional state, level of attention and biometrics. A security change can be applied that will automatically logoff the user from the system or from applications of the device, depending of the user's detected status, applying different security profiles at a software level, without disabling hardware.

9 Claims, 6 Drawing Sheets

(56) References Cited

OTHER PUBLICATIONS

"Enabling automatic logoff"; retrieved from https://www.ibm.com/support/knowledgecenter/en/ssw_aix_61/com.ibm.aix.security/enforcing_auto_logoff.htm; at least as early as Nov. 2017.
Beckman, K. "Automatically log off idle users in Windows", retrieved from https://4sysops.com/archives/automatically-log-off-idle-users-in-windows/; dated Mar. 2015.
"OS X Yosemite: Set your Mac to log out when not in use", retrieved from https://support.apple.com/kb/PH18670?viewlocale=en_US&locale=el_GR; dated Sep. 2015.
"Access Control: Automatic Logoff-What to Do and How to Do It"; retrieved from http://www.hipaa.com/access-control-automatic-logoff-what-to-do-and-how-to-do-it/; dated Jun. 2009.
"Last Pass", retrieved from https://lastpass.com/support.php?cmd=showfaq&id=153; as early as Dec. 2011.
"Configure Lock and Exit Parameters", retrieved from https://www.interactivebrokers.com/en/software/tws/usersguidebook/configuretws/configure_lock_and_exit_parameters.htm; as early as 2001.
"Sign out of Gmail", retrieved from https://support.google.com/mail/answer/8154?co=GENIE.Platform%3DDesktop&hl=en; as early as Jun. 2017.
"Line 9: Using Automatic Logoff", https://www3.rocketsoftware.com/rocketd3/support/documentation/mvb/33/refman/operations/line_9_using_automatic_logoff.htm; as early as Oct. 2016.
Barber, N. "How to remotely log out of Gmail", retrieved from https://www.pcworld.com/article/2144300/how-to-remotely-log-out-of-gmail.html; Apr. 2014.
"How do I log out of Facebook on another computer, phone or tablet?", https://www.facebook.com/help/211990645501187?helpref=faq_content; as early as Feb. 2017.

* cited by examiner

COGNITIVE SECURITY ADJUSTMENTS BASED ON THE USER

BACKGROUND

The present invention relates to computer security, and more specifically to cognitive security adjustments of a computer based on the user.

Unattended computers are an invitation to outsiders to gain access to confidential information. In seconds, an attacker with physical access to a computer can compromise the data, the system and even the entire network.

Most of the companies have policies related to unattended computers or devices. Currently the solution is to implement policies for unattended device based on time, meaning that the system or device will automatically logoff after a predetermined idle time. However, a time based automatic logoff is not secure because an attacker just needs seconds to gain access to the system, kill the idle counter and have full access to the data.

With the advent of mobile devices, there has also been an increasing demand for security measures when these devices are utilized for enterprise business environments. In some cases, employees can leverage their own mobile devices for work purposes after they have applied enterprise security mechanisms on their device. However, the enterprise applications available on the mobile devices also leverage the time-based approach to system logoff and do not have the "granularity" of changing the security settings, such as logoff and disabling of applications (apps).

Other security measures logoff applications when the modem is disconnected. However, this is not a secure implementation because it will require the user to disconnect the modem and that will require more work than logoff of the application or device, and therefore not a secure solution.

Additionally, there are applications that can execute remote logoff.

SUMMARY

According to one embodiment of the present invention, a method of adjusting security settings of a device based on cognitive analysis of the user is disclosed. The device comprising a camera, a microphone, and an input for receiving user sensor data. The method comprising the steps of: a computer monitoring the user for a facial change relative to the device; the computer determining that the facial change of the user relative to the device is outside of a user threshold; and the computer altering a security profile of the user on the device computer based on the facial change of the user.

According to another embodiment of the present invention, a computer program product for adjusting security settings of a device based on cognitive analysis of the user is disclosed. The device comprising a camera, a microphone, an input for receiving user sensor data, and a computer comprising at least one processor, one or more memories, one or more computer readable storage media, the computer program product comprising a computer readable storage medium having program instructions embodied therewith. The program instructions executable by the computer to perform a method comprising: monitoring, by the computer, a facial change of the user relative to the device; determining, by the computer, that the facial change of the user relative to the device is outside of a user threshold; and altering, by the computer, a security profile of the user on the device computer based on the facial change of the user.

According to another embodiment of the present invention, a computer system for adjusting security settings of a device based on cognitive analysis of the user. The device comprising a camera, a microphone, an input for receiving user sensor data, and a computer comprising at least one processor, one or more memories, one or more computer readable storage media having program instructions executable by the computer to perform the program instructions comprising: monitoring, by the computer, a facial change of the user relative to the device; determining, by the computer, that the facial change of the user relative to the device is outside of a user threshold; and altering, by the computer, a security profile of the user on the device computer based on the facial change of the user.

DETAILED DESCRIPTION

It should be noted that the embodiments of the present invention, that security detection system is based on the application of different security profiles for a user, does not disable any hardware, and is applied at the software level.

In an embodiment of the present invention, different security changes are applied based on the user status, such as emotional state, level of attention and biometrics. For example, a security change can be applied that will automatically logoff the user from the system, depending of the user's detected status.

By applying different security changes based on the user, the security and thus the performance of the device is improved.

Figure 1:
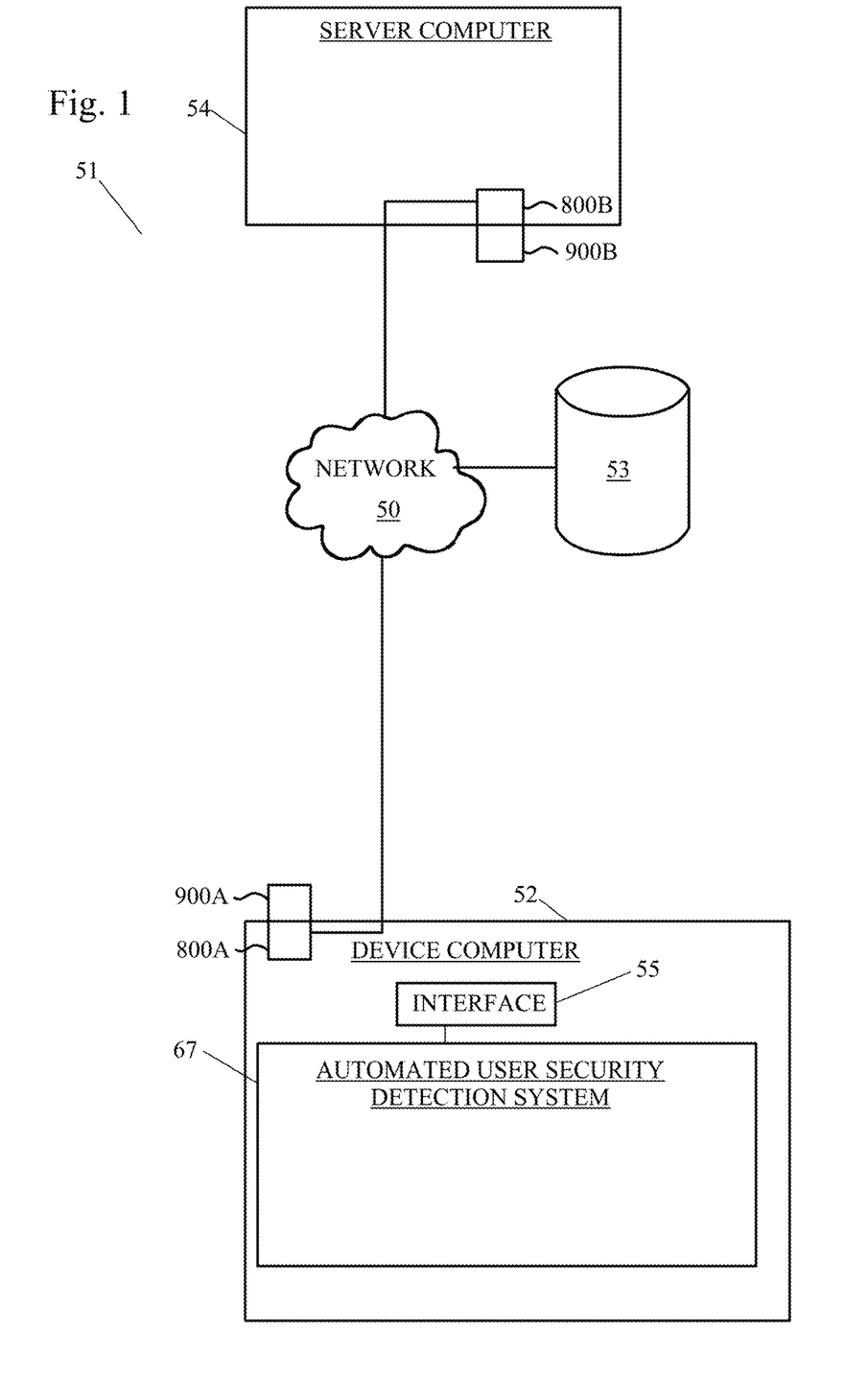
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, a repository 53, and a server computer 54 connect to network 50. In other exemplary embodiments, network data processing system 51 may include additional client or device computers, storage devices or repositories, server computers, and other devices not shown.

The device computer 52 contains an interface 55, which may accept commands and data entry from a user. The interface 55 can be, for example, a command line interface, a graphical user interface (GUI), a natural user interface (NUI) or a touch user interface (TUI). The device computer 52 preferably includes a camera. The device computer 52 preferably includes an automated user security detection system 67 and associated programs. The automated user security detection system 67 may also be executed as an application. An example of the components of the automated user security detection system 67 are shown in FIG. 3. While not shown, it may be desirable to have the an automated user security detection system 67 be present on the server computer 54. The device computer 52 includes a set of internal components 800a and a set of external components 900a, further illustrated in FIG. 2.

Server computer 54 includes a set of internal components 800b and a set of external components 900b illustrated in FIG. 1. In the depicted example, server computer 54 provides information, such as boot files, operating system images, and applications to the device computer 52. Server computer 54 can compute the information locally or extract the information from other computers on network 50. The server computer 54 may contain the automated user security detection system 67 and may be executed through an application on the device computer 52.

Figure 2:
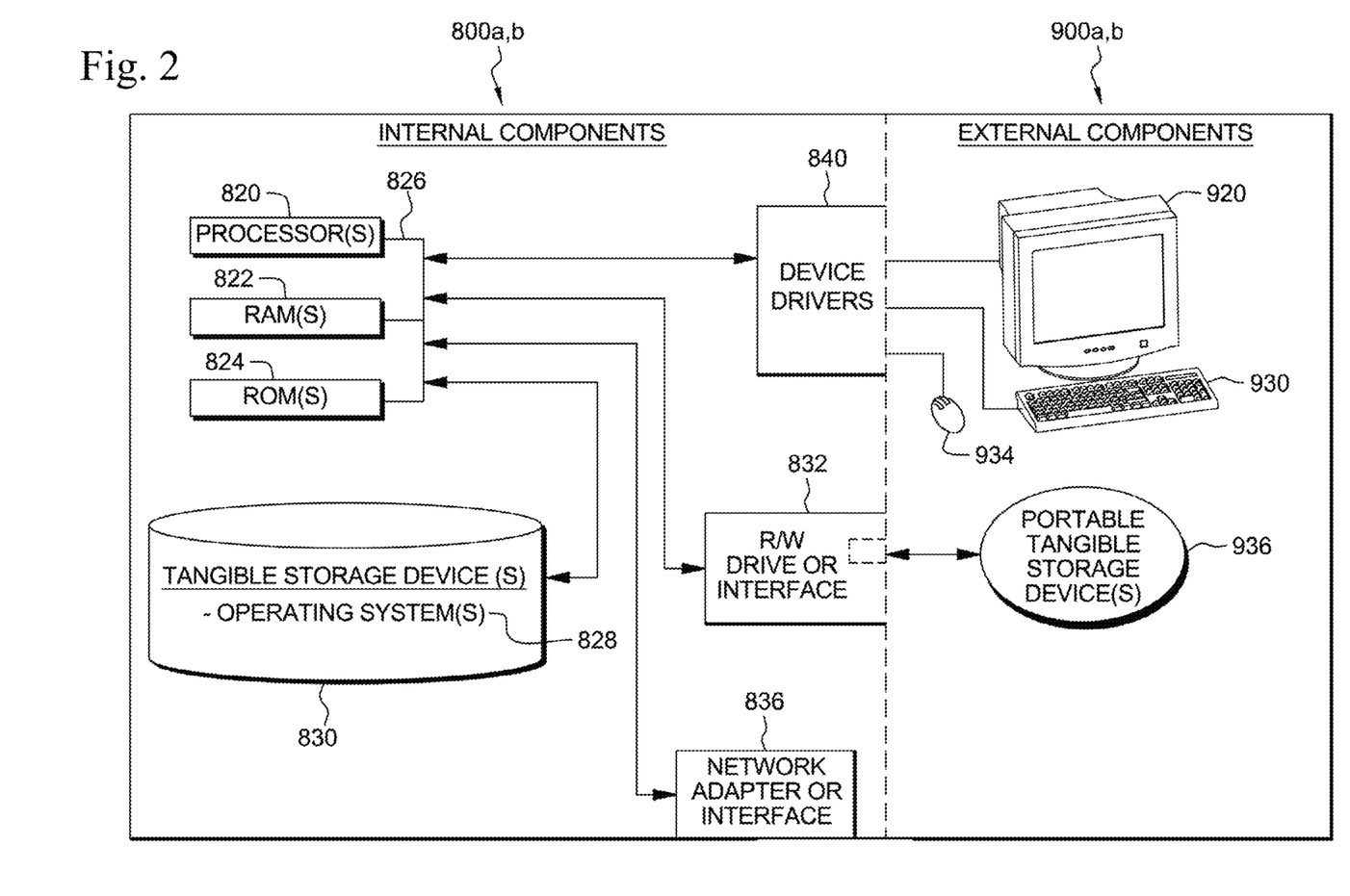
FIG. 2 illustrates internal and external components of a client computer and a server computer in which illustrative embodiments may be implemented.
Figure 3:
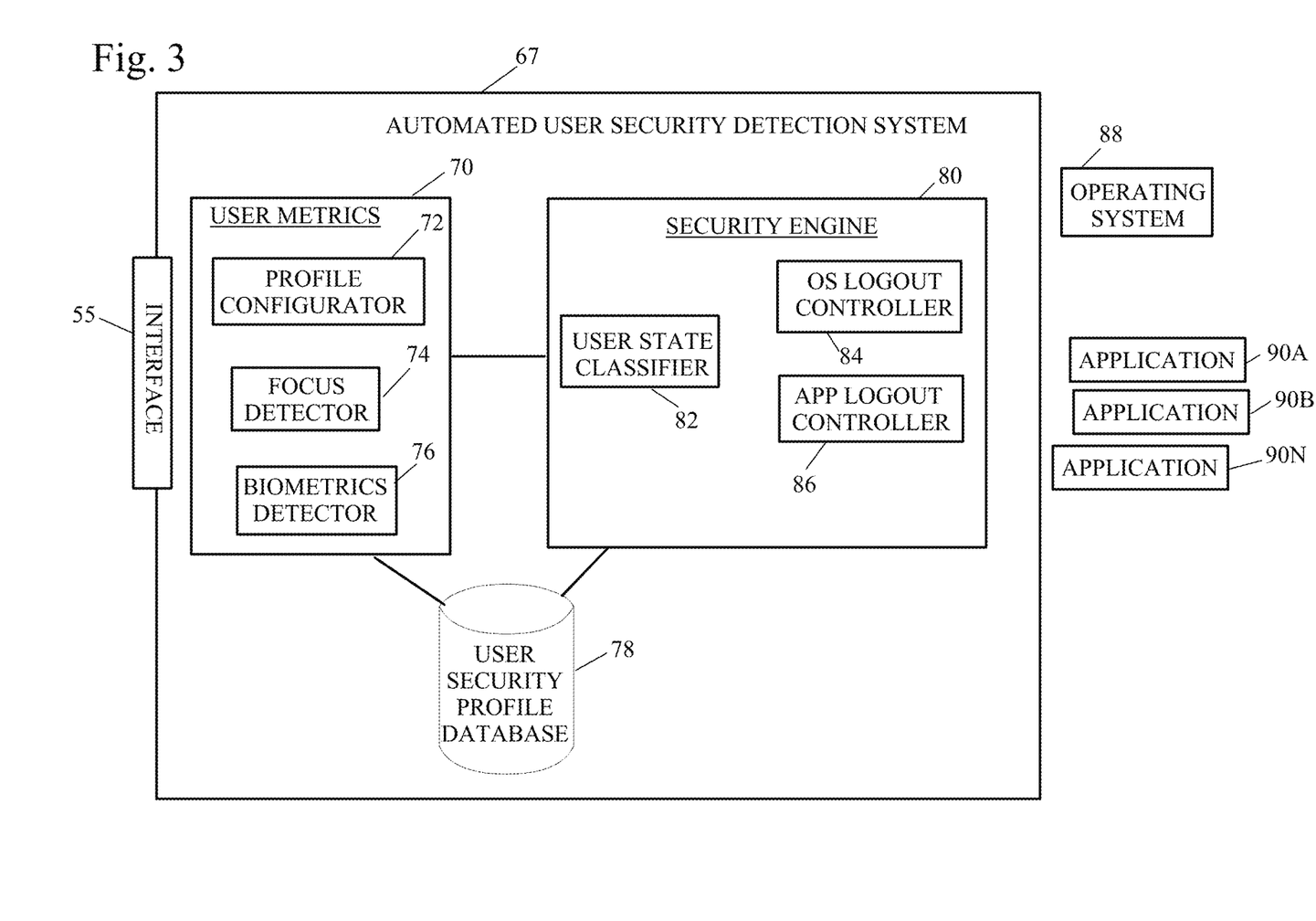
FIG. 3 shows an example of an architecture diagram of an automated user security detection system of an embodiment of the present invention.

Program code and programs such as within the automated user security detection system 67 may be stored on at least one of one or more computer-readable tangible storage devices 830 shown in FIG. 2, on at least one of one or more portable computer-readable tangible storage devices 936 as shown in FIG. 2, or on repository 53 connected to network 50, or may be downloaded to a device computer 52 or server computer 54, for use. For example, program code and programs such as associated with the automated user security detection system 67 may be stored on at least one of one or more storage devices 830 on server computer 54 and downloaded to device computer 52 over network 50 for use. Alternatively, server computer 54 can be a web server, and the program code, and programs associated with the automated user security detection system 67 may be stored on at least one of the one or more storage devices 830 on server computer 54 and accessed device computer 52. In other exemplary embodiments, the program code, and programs associated with the automated user security detection system 67 may be stored on at least one of one or more computer-readable storage devices 830 on device computer 52 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

FIG. 2 illustrates internal and external components of a device computer 52 and server computer 54 in which illustrative embodiments may be implemented. In FIG. 2, a device computer 52 and a server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and automated user security detection system 67 are stored on one or more of the computer-readable tangible storage devices 830 for execution by one or more of the processors 820 via one or more of the RAMs 822 (which typically include cache memory). In the embodiment illustrated in FIG. 2, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. The automated user security detection system 67 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. The automated user security detection system 67 can be downloaded to the device computer 52 and server computer 54 from an external computer via a network (for example, the Internet, a local area network or other, wide area network) and network adapter or interface 836. From the network adapter or interface 836, automated user security detection system 67 is loaded into hard drive 830. Automated user security detection system 67 can be downloaded to the server computer 54 from an external computer via a network (for example, the Internet, a local area network or other, wide area network) and network adapter or interface 836. From the network adapter or interface 836, automated user security detection system 67 is loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Automated user security detection system 67 can be written in various programming languages including low-level, high-level, object-oriented or non object-oriented languages. Alternatively, the functions of an automated user security detection system 67 can be implemented in whole or in part by computer circuits and other hardware (not shown).

It should be noted that the automated user security detection system 67 can be run as a web application as a service in a cloud computing environment. Furthermore, in an alternate embodiment, the automated user security detection system 67 can be added to enhance an existing application.

FIG. 3 shows an example of an architecture diagram of an automated user security detection system of an embodiment of the present invention.

The automated user security detection system 67 interfaces with the user through interface 55 of the device computer 52. The automated user security detection system 67 also communicated with the operating system (OS) 88 of the device computer 52 as well as other applications 90a-90n of the device computer 52. The automated user security detection system 67 includes a security engine 80, user metrics 70, and a user security profile database 78.

The user metrics 70 includes a profile configurator 72, a focus detector 74 and a biometric detector 76.

The profile configurator 72 is a separate user interface or incorporated into interface 55, providing an administrator the ability to create user baseline, configurations and thresholds for the system to leverage during operation.

The focus detector 74 works with a camera and microphone of the device computer 52 to determine a change in the user's focus.

The biometrics detector 76 works with the user's sensors, such as Internet of Things (IoT) to determine a change in user's biometrics.

The security engine includes a user state classifier 82, an operating system (OS) logout controller 84, an app logout controller 86.

The user state classifier 82 works in conjunction with the focus detector 74 and the biometrics detector 76 to determine what type of change the user is experiencing and ensure appropriate OS or App logout is triggered via the OS logout controller 84 and/or the App logout controller 86 of the automated user security detection system 67.

The OS logout controller 84 is triggered by the user state classifier 82 to perform an OS logoff function.

The App logout controller 86 is triggered by the user state classifier 82 to perform an application logoff function for one or more applications 90a-90n.

The user security profile database 78 is a database containing appropriate user profile settings (baseline and threshold) as well as a listing of OS and Apps that the user currently has open or running on the device computer 52.

The operating system 88 is the operating system that the security detection system 67 needs to logoff of.

Applications 90a-90n is an application or apps that the running in the OS, that the security system 67 needs to logoff of.

Figure 4:
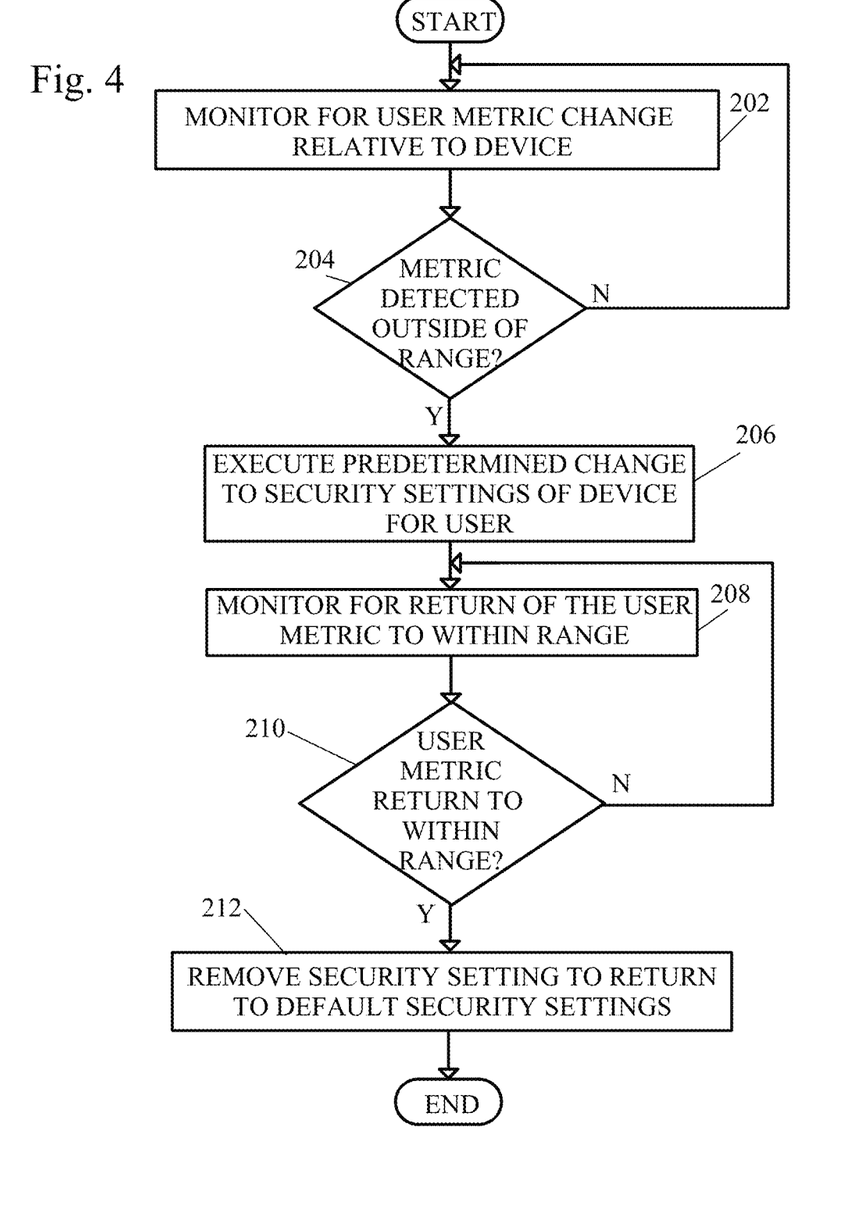
FIG. 4 shows a flowchart of a method of adjusting security settings of a device based on cognitive analysis.

FIG. 4 shows a flowchart of a method of adjusting security settings of a device computer based on cognitive analysis.

In a first step (step 202) the automated user security detection system 67 monitors for a user metric change relative to the device computer 52. The user metric change may be a change to the metrics of a user's attention level, user emotional state, user's focus level and/or user biometrics. It should be noted that prior to the method of adjusting security settings of the device computer, baseline readings would be established by the user. The baseline readings may include, but are not limited to heart rate, perspiration, stress levels, distance of the user's face relative to the device computer, face recognition, and other factors.

The user's biometrics may be detected by the biometrics detector 76 which receives data from user's IoT sensors, such as smartwatch or other personal device containing biometric or IoT sensors. The user state classifier 82 may additionally employ personality insights, tone analyzer and speech to text capabilities to detect a user's emotional state.

The user's face may be recognized using a focus detector 74 executing a facial recognition software. If the user's is too far out of range for the focus detector 74 to detect the user's facial features, the user would be considered out of range of the device computer 52.

The user focus level will be recognized using a focus detector 74, executing a plurality of methods including but not limited to: facial recognition, voice recognition and other advance tools to detect current user focus. Then, the system will use a scoring system to determine the variation of focus of the conversation For any user metric change detected relative to the device computer, determining whether the metric change is within an established range or threshold (step 204). The change detected may be a user's detected emotional state, user's focus level, user biometrics or a user's presence within an established range of the device computer. If the metric change is within an established range or threshold, the method returns to step 202 of monitoring. When the user's metric, for example, user's behavior and biometrics, are within the established range, a default security setting or profile is applied. The default security setting may be established by an administrator and include standard security settings as designated by the organization employing the security detections system 67.

If a user metric change relative to the device computer is detected to be outside of an established range or threshold (step 204), such as the user's detected emotional state, user biometrics or a user's presence outside of an established range of the device computer, the automated user security detection system 67 automatically triggers a predetermined change to the security settings of the device computer for the user (step 206).

For example, if the user's detected emotional state is determined to be upset or angry, a specific security profile may be applied. The security profile includes a predetermined change to the security settings. In this case, if the user's detected emotional state is angry, the security detection system 67 may logoff the user from the operating system. The predetermined change to the security settings may vary among the different profiles as set by the administrator. Another security profile may be applied if the system determines that the user is fearful and their heartrate is increased above a threshold. In this case, the security change may be to close all applications, logoff the user from the operating system and require two different authentications for the user to be able to log back onto the system.

If the system cannot detect user's state (for example unable to get face recognition inputs) and the heartrate is below the predetermined lower rate, then the system may also log off the user as the user may have a medical/health emergency (like fainting).

The predetermined change may be categorized as a specific profile or setting which, based on the detected range of threshold is executed. The predetermined change to the security setting may be an automatic logoff from the operating systems, applications, web services or other systems. The predetermined change may include a warning to the user or a request for reauthentication of the user prior to allowing access to the systems and applications of the device computer.

The automated user security detection system 67 monitors for return of the user metric to within the established range or threshold (step 208).

If the user metric has not returned to within the established range or threshold (step 210), the method returns to step 208 of monitoring.

If the user metric has returned to within the established range or threshold (step 210), the automated user security detection system 67 removes the security setting (step 212) to return the security settings to a default setting, and the method either ends or returns to step 202 of monitoring.

In an alternate embodiment, instead of the automated user security detection system 67 removing the security setting of the device computer 52, the automated user security detection system 67 may send an inquiry to the user via the interface 55 for additional authentication, such as a passcode, pin, password or biometric reading. If the user successfully provides authentication consistent with the user's profile, the security setting is removed and the user is allowed access to the device computer and its associated applications and the security setting is set to a default setting. If the user does not provide authentication consistent with the user's profile, the security setting remains.

For example, a bank teller leaves their device computer which is running a banking system to pick up copies from a printer approximately 20 feet away. To avoid the risk of another individual accessing the teller's device computer, the security system of the device computer monitors for the teller's face relative to the device computer via a camera. Based on the input received from the camera, the focus detector 74 determines whether the user is within range of the device computer. The acceptable range for the user to be relative to the device computer not employing a security change may be two feet. When the focus detector 74 detects that the teller is greater than two feet away via the camera, the automated user security detection system 67 automatically executes a security measure or profile. In this example, the security measure may be an automatic logoff of the teller from the banking system.

Figure 5:
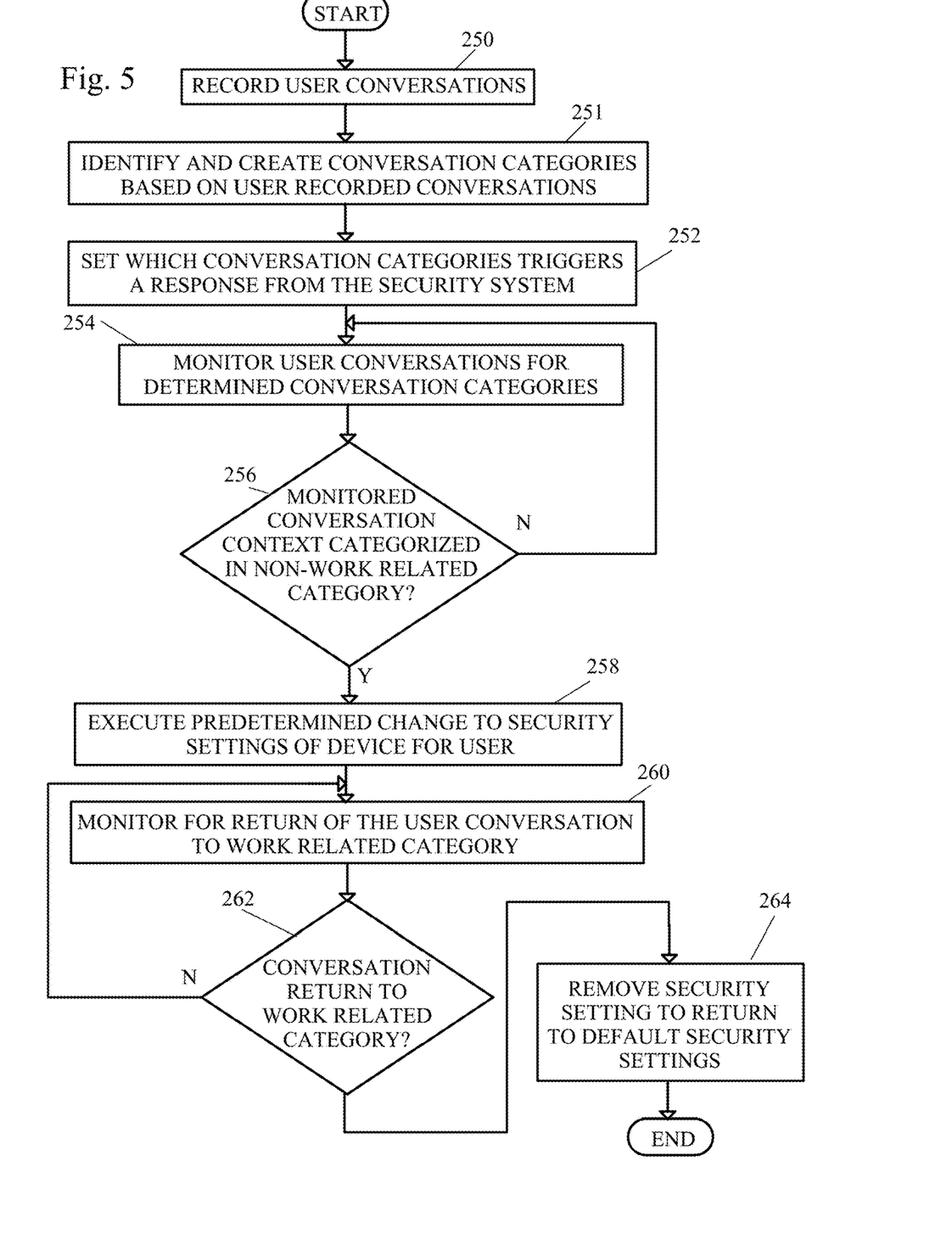
FIG. 5 shows a flowchart of an alternate method of adjusting security settings of a device based on cognitive analysis.

FIG. 5 shows a flowchart of an alternate method of adjusting security settings of a device based on cognitive analysis.

In a first step, the focus detector 74 of the automated user security detection system 67 records user conversations (step 250). From the recorded user conversations, the focus detector 74 identifies and creates conversation categories (step 251). This can be achieved using any known method including but not limited to: IBM Watson speech to text, text to speech, Tone Analyzer, personality insights, Natural Language classifier and natural language understanding.

The automated user security detection system 67 determines which of the created conversation categories triggers a response by the automated user security detection system 67 (step 252). The user or admin then select which categories are work related and which are not. For example, work related categories may be, but not limited to: Projects, Finance, Scheduling and non-work related categories may be, but not limited to all topics not present in the work related categories or specifically, sports, news, and fashion.

The focus detector 74 of the automated user security detection system 67 monitors user conversations, for example using a microphone and camera of the device computer 52, to determine whether a current conversation falls into a specific identified category (step 254). The determination of whether the conversation should be classified into a category may be using any known method including but not limited to: IBM Watson speech to text, text to speech, Tone Analyzer, personality insights, Natural Language classifier and natural language understanding. A program such as a sentiment analysis program may be incorporated into the security detection system 67 or the automated user security detection system 67. The sentiment analysis program can analyze external sounds and the speech the microphone records or "hears" for tone of the speakers, personality insights, context of speech spoken by different speakers and other factors.

If the monitored conversation context of the user is categorized in a category which would not trigger a response from the security system (step 256), the method returns to step 254 of monitoring the current conversation.

If the monitored conversation context of the user is categorized in a category which would trigger a response from the security system (step 256), the automated user security detection system 67 executes a predetermined change to the security settings of the device of the user (step 258). The categories which preferably trigger a response are non-work related categories.

For example, depending on the conversation category, different security profiles may be applied. The security profiles each include a predetermined change to the security settings. The security changes can include, but are not limited to logging off or closing applications, logoff from the operating system and other changes to the operating system or applications.

The automated user security detection system 67 monitors for return of the user conversation to a work related category (step 260).

If the user conversation has not returned to a conversation category which is identified as work related (step 262), the method returns to step 260 of monitoring.

If the user has returned to a conversation category which is identified as work related (step 262), the automated user security detection system 67 removes the security setting (step 264) to return the security settings to a default setting, and the method either ends or returns to step 254 of monitoring.

In an alternate embodiment, instead of the automated user security detection system 67 removing the security setting of the device computer 52, the automated user security detection system 67 may send an inquiry to the user via the interface 55 for additional authentication, such as a passcode, pin, password or biometric reading. If the user successfully provides authentication consistent with the user's profile, the security setting is removed and the user is allowed access to the device computer and its associated applications and the security setting is set to a default setting. If the user does not provide authentication consistent with the user's profile, the security setting remains.

Figure 6A:
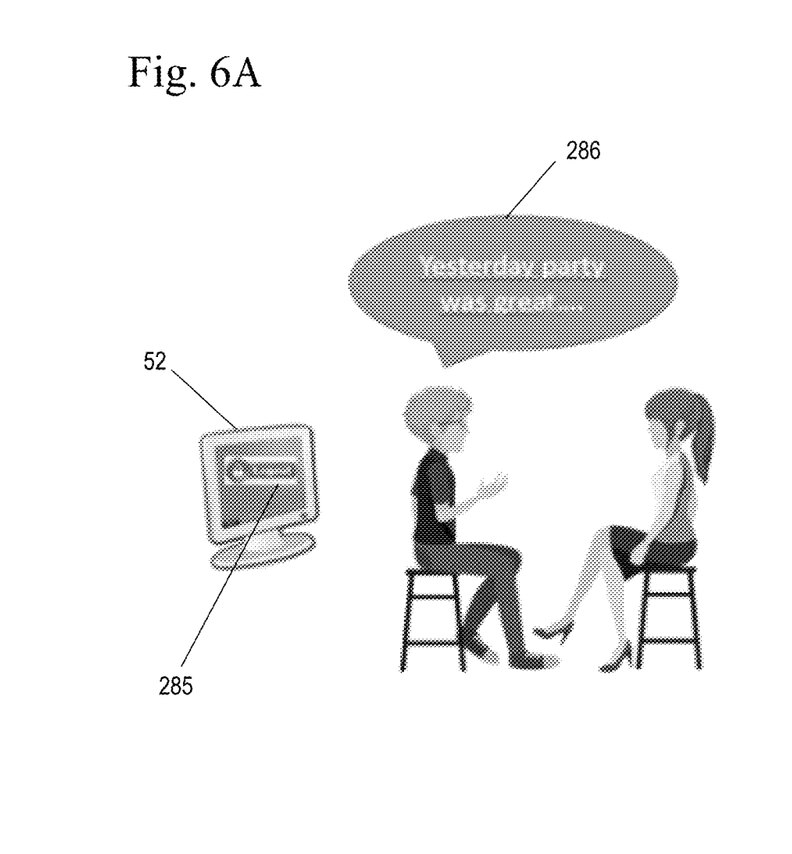
FIGS. 6a-6b shows a schematic of an example of the implementation of the method of FIG. 5.
Figure 6B:
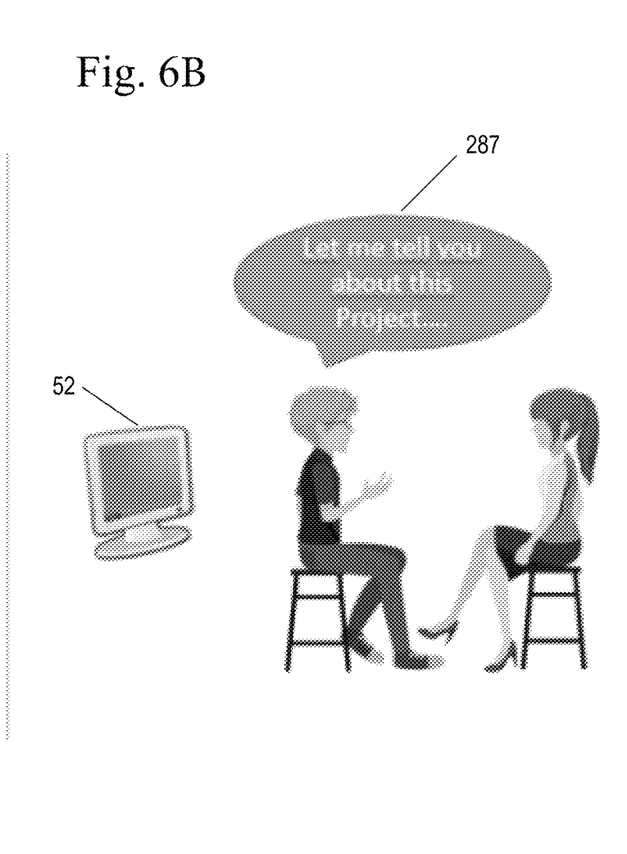

For example, a user can be having a conversation with a colleague about a given project and how the user is trying to control the budget. That conversation would be identified as being associated with a work-related category 287 and therefore no action required. However, the user may jump to another topic that is non-work related 286, for example about a party as shown in FIG. 6a. Based on the context of the monitored user conversation, the conversation is identified as belonging to a non-work related category 286 and the automated user security detection system 67, also determines that user is no longer focusing on the device computer 52. The security profile may be implemented in which the automated user security detection system 67 automatically logs the user off of an application or an operating system of their device computer 52. If the context of the conversation was regarding a topic associated with work 287 as shown in FIG. 6a, the default security profile in which the user remains logged into the system may persist.

In the above embodiments, the automated user security detection system 67 works in conjunction with the user state classifier 82 to trigger the OS logout controller 84 or the App logout controller 86 to change the security settings of the device computer 52 relative to the user. If the automated user security detection system 67 was installed locally on a device computer, the security detection system 67 listens for instructions to alter the security profile of the user. If the automated user security detection system 67 is installed on a node of a cloud, the automated user security detection system 67 would act as a service and change the security profile for the user through an application.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of adjusting security settings of a device based on cognitive analysis of the user, the device comprising a computer, a camera, a microphone, and an input for receiving user biometric sensor data from a biometric sensor, the method comprising the steps of:
    the computer monitoring the user for a facial change representative of an emotional state of the user relative to the device;
    the computer determining that the facial change of the user relative to the device is a designated emotional state of the user via a combination of an image captured by the camera and sound captured by the microphone; and
    the computer altering a security profile of the user applied on the device based on the facial change of the user, the sound captured by the microphone and the user biometric sensor data from the biometric sensor;
        wherein when the designated emotional state of the user is angry based on at least a tone of the sound captured by the microphone being above a sound threshold, the altering of the security profile logs the user off of an operating system being executed by the device; and
        wherein when the designated emotional state of the user is fearful based on at least a heartrate captured by the biometric sensor being above a heartrate threshold, the altering of the security profile logs the user off of any applications being executed by the device.

2. The method of claim 1, further comprising monitoring for changes to the biometric sensor data of the user received as input to the device.

3. The method of claim 1, wherein the computer monitors, via the camera, for a change in focus of the user relative to the device.

4. A computer program product for adjusting security settings of a device based on cognitive analysis of the user, the device comprising a camera, a microphone, an input for receiving user biometric sensor data from a biometric sensor, and a computer comprising at least one processor, one or more memories, one or more computer readable storage media, the computer program product comprising a computer readable storage medium having program instructions embodied therewith, the program instructions executable by the computer to perform a method comprising:
    monitoring, by the computer, a facial change of the user representative of an emotional state of the user relative to the device;
    determining, by the computer, that the facial change of the user relative to the device is a designated emotional state of the user via a combination of an image captured by the camera and sound captured by the microphone; and
    altering, by the computer, a security profile of the user applied on the device based on the facial change of the user, the sound captured by the microphone and the user biometric sensor data from the biometric sensor;
        wherein when the designated emotional state of the user is angry based on at least a tone of the sound captured by the microphone being above a sound threshold, the altering of the security profile logs the user off of an operating system being executed by the device; and
        wherein when the designated emotional state of the user is fearful based on at least a heartrate captured by the biometric sensor being above a heartrate threshold, the altering of the security profile logs the user off of any applications being executed by the device.

5. The computer program product of claim 4, further comprising monitoring, by the computer, for changes to the biometric sensor data of the user received as input.

6. The computer program product of claim 4, wherein the computer monitors, via the camera, for a change in focus of the user relative to the device.

7. A computer system for adjusting security settings of a device based on cognitive analysis of the user, the device comprising a camera, a microphone, an input for receiving user biometric sensor data from a biometric sensor, and the computer system comprising a computer comprising at least one processor, one or more memories, one or more computer readable storage media having program instructions executable by the computer of the computer system to perform the program instructions comprising:
    monitoring, by the computer, a facial change of the user representative of an emotional state of the user relative to the device;
    determining, by the computer, that the facial change of the user relative to the device is a designated emotional state of the user via a combination of an image captured by the camera and sound captured by the microphone; and
    altering, by the computer, a security profile of the user applied on the device based on the facial change of the user, the sound captured by the microphone and the user biometric sensor data from the biometric sensor;
        wherein when the designated emotional state of the user is angry based on at least a tone of the sound captured by the microphone being above a sound threshold, the altering of the security profile logs the user off of an operating system being executed by the device; and
        wherein when the designated emotional state of the user is fearful based on at least a heartrate captured by the biometric sensor being above a heartrate threshold, the altering of the security profile logs the user off of any applications being executed by the device.

8. The computer system of claim 7, further comprising monitoring, by the computer, for changes to the biometric sensor data of the user received as input.

9. The computer system of claim 7, wherein the computer monitors, via the camera, for a change in focus of the user relative to the device.

* * * * *